United States Patent
Gous et al.

(10) Patent No.: US 7,734,813 B2
(45) Date of Patent: Jun. 8, 2010

(54) METHOD AND SYSTEM FOR COMMUNICATING PREDICTED NETWORK BEHAVIOR BETWEEN INTERCONNECTED NETWORKS

(75) Inventors: Alan Gous, Palo Alto, CA (US); Arman Maghbouleh, Mountain View, CA (US); Arash Afrakhteh, Palo Alto, CA (US); Andre Hentz, Mountain View, CA (US)

(73) Assignee: Cariden Technologies, Inc., Mountain View, CA (US)

( * ) Notice: Subject to any disclaimer, the term of this patent is extended or adjusted under 35 U.S.C. 154(b) by 275 days.

(21) Appl. No.: 11/341,057

(22) Filed: Jan. 27, 2006

(65) Prior Publication Data

US 2006/0174154 A1 Aug. 3, 2006

Related U.S. Application Data

(60) Provisional application No. 60/647,900, filed on Jan. 28, 2005.

(51) Int. Cl.
*G06F 15/173* (2006.01)
(52) U.S. Cl. .................. 709/238; 709/226; 709/239; 709/242
(58) Field of Classification Search ............... 709/232, 709/223–224, 230, 238, 226, 239, 242; 707/102; 715/700; 370/228, 229, 235, 238
See application file for complete search history.

(56) References Cited

U.S. PATENT DOCUMENTS

| | | | |
|---|---|---|---|
| 5,987,521 A * | 11/1999 | Arrowood et al. | 709/239 |
| 6,098,107 A * | 8/2000 | Narvaez-Guarnieri et al. | 709/239 |
| 6,195,703 B1 * | 2/2001 | Blumenau et al. | 709/238 |
| 6,282,575 B1 * | 8/2001 | Lin et al. | 709/244 |
| 6,356,530 B1 * | 3/2002 | Tomaszewski et al. | 370/232 |
| 6,363,319 B1 * | 3/2002 | Hsu | 701/202 |
| 6,621,798 B1 * | 9/2003 | Krishnan et al. | 370/256 |
| 6,999,432 B2 * | 2/2006 | Zhang et al. | 370/328 |
| 7,302,482 B2 * | 11/2007 | Rodosek et al. | 709/224 |
| 7,370,096 B2 * | 5/2008 | Gous et al. | 709/221 |
| 7,505,413 B2 * | 3/2009 | Gous | 370/237 |
| 2002/0083187 A1 * | 6/2002 | Sim et al. | 709/235 |
| 2002/0101821 A1 * | 8/2002 | Feldmann et al. | 370/232 |
| 2002/0103631 A1 * | 8/2002 | Feldmann et al. | 703/22 |
| 2002/0165957 A1 * | 11/2002 | Devoe et al. | 709/224 |
| 2003/0088671 A1 * | 5/2003 | Klinker et al. | 709/225 |
| 2004/0213221 A1 * | 10/2004 | Civanlar et al. | 370/389 |
| 2007/0002768 A1 * | 1/2007 | Nandy et al. | 370/255 |

* cited by examiner

*Primary Examiner*—Faruk Hamza
(74) *Attorney, Agent, or Firm*—Schwegman, Lundberg & Woessner, P.A.

(57) ABSTRACT

A method of communicating predicted network behavior includes generating network topology structure data describing at least part of a topology of a first network. Demand structure data is generated, the demand structure data describing at least some traffic demands relating to a source in the first network and a destination in a second network, wherein there are a plurality of network links between the first network and the second network. Traffic routing change data, describing at least one change scenario which would require a change of traffic routing, is generated. This data is then used to calculate change data that describes a routing of traffic through each of the plurality of network links between the first network and the second network for the at least one change scenario. The change data is transmitted to the second network.

17 Claims, 14 Drawing Sheets

400

| TOPOLOGY STRUCTURE (NETWORK A) | | | | | |
|---|---|---|---|---|---|
| LINK ID | FROM | FROM NODE/AS | TO | TO NODE/AS | METRIC |
| P1 | N4 | NODE | NB | AS | – |
| P2 | N5 | NODE | NB | AS | – |
| P3 | N6 | NODE | NB | AS | – |
| N1 – N4 | N1 | NODE | N4 | NODE | 5 |
| N4 – N1 | N4 | NODE | N1 | NODE | 5 |
| (OTHER LINKS) | | | | | |

410

| DEMANDS STRUCTURE (NETWORK A) | | | |
|---|---|---|---|
| DEMAND ID | FROM | TO | TRAFFIC (Mb/s) |
| DA1 | N1 | NB | 50 |
| DA2 | N2 | NB | 100 |
| DA3 | N2 | NB | 100 |
| (OTHER DEMANDS) | | | |

FAILURE STRUCTURE (NETWORK A)

| | LINK ID | | | | |
|---|---|---|---|---|---|
| FAILURE ID | P1 | P2 | P3 | N1 – N4 | N4 – N1 (OTHER LINKS) |
| P1 | X | | | | |
| P2 | | X | | | |
| P3 | | | X | | |
| (OTHER FAILURES) | | | | | |

510

FAILURE STRUCTURE (NETWORK B)

| | LINK ID | | | | |
|---|---|---|---|---|---|
| FAILURE ID | P1 | P2 | P3 | N8 – N7 | N8 – N10 (OTHER LINKS) |
| NODE N8 | | X | | X | X |
| (OTHER FAILURES) | | | | | |

*FIG. 5*

PEER LINK USAGE STRUCTURE (NETWORK A) — 700

| FAILURE ID / LINK ID | P1 | P2 | P3 |
|---|---|---|---|
| NO FAILURE | 50 | 150 | 50 |
| P1 | – | 200 | 50 |
| P2 | 150 | – | 100 |
| P3 | 50 | 200 | – |

FALLOVER MATRIX STRUCTURE (NETWORK A) — 710

| FAILURE ID / LINK ID | P1 | P2 | P3 |
|---|---|---|---|
| P1 | – | +100% | +0% |
| P2 | +67% | – | +33% |
| P3 | +0% | +100% | – |

*FIG. 7*

NETWORK SIMULATOR

METHOD AND SYSTEM FOR COMMUNICATING PREDICTED NETWORK BEHAVIOR BETWEEN INTERCONNECTED NETWORKS

CLAIM OF PRIORITY

The present patent application claims the priority benefit of U.S. Provisional Application Ser. No. 60/647,900 filed on Jan. 28, 2005, the entire content of which is incorporated herein by reference.

FIELD

Embodiments relate generally to the technical field of network data communications and, in one example embodiment, to methods and systems to communicate predicted network behavior between interconnected networks.

BACKGROUND

Networks, for example telecommunications networks, deliver data, or traffic, from sources to destinations within the network. These networks may be operated by companies that use the networks for their own private communications. They may also be operated by service providers, which make the network available to others to use for communication of their own data.

It is often useful for two or more network operators to allow traffic to travel between their respective networks, to extend the range of communication available to those using the networks. The Internet is the largest such collection of intercommunicating networks. A network operator, A, may pay another network operator, B, to allow traffic sourced from or destined to users of Network A to travel over Network B. This arrangement is referred to as Network A buying transit from Network B. There may also be a reciprocal arrangement between Networks A and B in which, without charge, both allow traffic sourced and destined for users of their respective networks to travel over the other network, without payment. This arrangement is known as peering. A network may engage in multiple transit and peering arrangements with other networks.

BRIEF DESCRIPTION OF THE DRAWINGS

FIG. 4. represents two data structures used by the systems of FIG. 1 to store data used in the creation and use of a Failover Matrix Structure.

FIG. 5. represents a Failure Structure which is used by the systems of FIG. 1 to describe the failure scenarios of interest in the construction and use of the Failover Matrix.

FIG. 7. shows an example of a Failover Matrix Structure.

DETAILED DESCRIPTION

Figure 1:
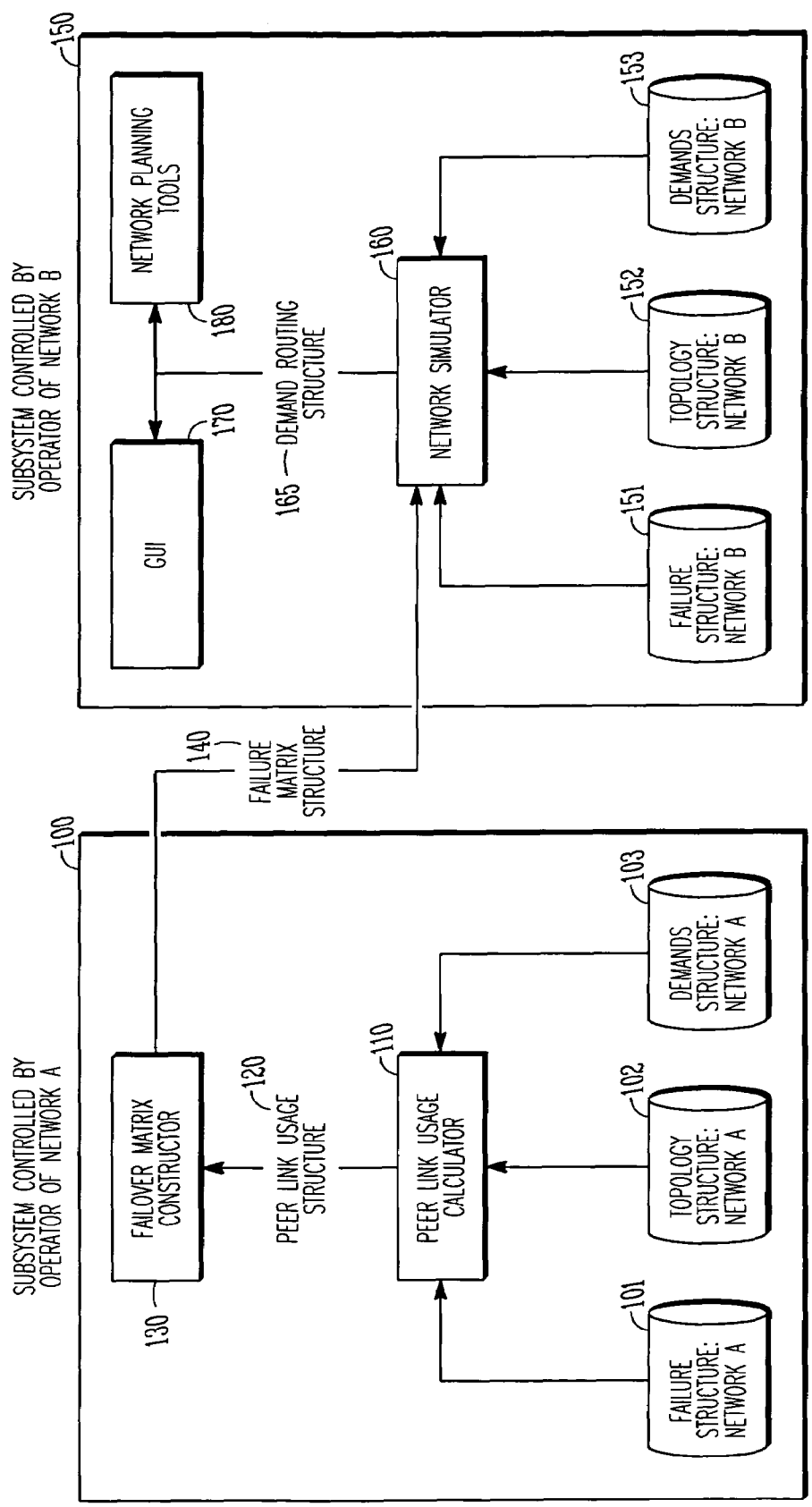
FIG. 1 is a block diagram representing an overall routing exchange system.

In this document certain mechanisms are described to facilitate these peering and transit arrangements. Throughout the particular instance of two networks, A and B, interchanging traffic will be referred to. For convenience A and B will be referred to as peering with one another, although the contractual arrangement may be different from the definition of peering above. While only two networks are referred to, the networks may at the same time be engaged in interchanging traffic with other networks. The mechanisms described may be extended, to facilitate peering between multiple networks.

If Network B wishes to peer with another Network A, two desiderata may be considered:
1. Each network may like to know as much information about the other network as possible in order to help predict and plan for the nature of the traffic that may be interchanged between the networks.
2. However, each network may like to restrict the knowledge that the other network has of their own network as much as possible, for example (amongst other reasons) to prevent the other network from obtaining any commercial advantage from this knowledge, if these networks belong to competing commercial entities.

The type of information that Network B would like to know about Network A may include, but not be restricted to: the amount of traffic that will flow through Network B originating or terminating at Network A; the entry and exit points within Network B where the traffic enters and leaves Network A; and what paths this traffic will take within Network B. Network B would also like information about possible future changes to these properties of the traffic due to, amongst other events: failures of components within Network A; planned outages of components within Network A; and routing policy or topology changes within Network A. In this document all these events are described as changes or failures within Network A, recognizing that causes other than an actual network element failure may be responsible for the event that results in the shift in traffic.

This information would be useful to Network B for, amongst other reasons: planning the paths that traffic from and to Network A, and other traffic in its network will take, to minimize the possibility of overloading or congestion in the network; to help in planning for future changes to the network design, including capacity and topology changes; to know what level of service it is able to offer to its own clients now and in the future.

In this document an example mechanism allowing two peering networks, A and B, to balance the requirements of 1 and 2 above is proposed. Included in this mechanism are particular data structures which may be exchanged between the two networks. The data structure provided to Network B from Network A, for example, reveals enough about the current and possible future behavior of the traffic exchanged between the two networks to be useful to Network B for planning purposes. At the same time, the structure provides minimal information about the internal design of Network A itself, and therefore provides privacy to Network A. Network B may provide a similar data structure, in return, to Network A. Of course, Network B may compensate Network A for providing this information in other ways too, for example by paying for the information.

The method is illustrated here using first and second networks with the particular case of the first network, Network A, providing this information to the second network, Network B, to help Network B predict the behavior of traffic which passes from Network A to Network B, and whose entry point into Network B is controlled by Network A. This may be the case, for example, when Network A and Network B are in a peering arrangement. The method can readily be extended to the case in which Network A provides information to Network B to predict the behavior of traffic which passes from Network B to Network A, but whose entry point into Network A is controlled by Network A. This case occurs, for example, when Network A is a customer of Network B, and therefore is paying Network B for the ability to specify the entry points of traffic into Network A from Network B.

The modeling of the Networks A and B uses the concept of demands for transmission of network traffic. These demands specify that a certain quantity of traffic from a particular source in a network (or entering the network at that source), is destined for a particular destination in that network or another network. The traffic for that demand is then routed through the network(s) using the network routing protocols implemented by the respective networks. A routing protocol used in the Internet is IP (Internet Protocol). Different failure states in the network may result in different routes being taken. Within IP, networks maintain a degree of control over the routing of their traffic. So, in the example above, Network A may be able to control the entry points of the demands from Network A into Network B.

Methods of estimating network demands, and of using network simulation information for the purpose of planning and modification of future routing paths in the network, are described in U.S. patent application Ser. No. 10/937,988, titled "METHODS AND SYSTEMS TO PERFORM TRAFFIC ENGINEERING IN A METRIC-ROUTED NETWORK", filed Sep. 9, 2004, the contents of which are incorporated herein by reference.

FIG. 1 is a block diagram representing an overall routing exchange system. It consists of two subsystems, 100 and 150, according to an example embodiment. Subsystem 100 is under the control of the operator of Network A. Subsystem 150 is under the control of the operator of Network B.

Subsystem 100 may generate and use three sets of data structures representing Network A and its connections to Network B:

1. A Topology Structure 102 describes, in the example embodiment, the topology of Network A. Included in this topology structure 102 is a representation of the links connecting Network A and Network B.
2. A Demands Structure 103 describes, in the example embodiment, a set of point-to-point traffic demands with source in Network A and destination in Network B. These demands represent the amount of network traffic that Network A is attempting to transmit from various points within Network A, to Network B.
3. A Failure Structure 101 describes, in the example embodiment, a list of scenarios of changes of elements in Network A. The changes may be failure scenarios or maintenance scenarios. Network A wishes to supply Network B with information about the behavior of the traffic entering Network B from Network A under this list of scenarios.

Details of these structures are provided in FIGS. 4 and 5.

In an example embodiment these structures are generated by modules (not shown) which form part of the subsystem 100, namely a network topology module, a traffic demands module and a traffic routing change module.

The data structures 101, 102 and 103 are used by the Peer Link Usage Calculator 110 to calculate a Peer Link Usage Structure 120. The calculator is described further in FIG. 11 and the resulting structure in FIG. 7. The Peer Link Usage Structure describes how much traffic is routed through each of the peering links from Network A to Network B under each of the failure scenarios in the Failure Structure 101.

The Peer Link Usage Structure 120 is used by the Failover Matrix Constructor 130 to calculate change data in the form of a Failover Matrix Structure 140, which is transmitted from subsystem 100 to subsystem 150. The Failover Matrix Structure 140 describes how traffic moves from one peering link to another under the failover scenarios listed in the Failure Structure 101. Further details of the Failover Matrix Structure are provided in FIG. 7, and further details of the Failover Matrix Constructor are provided in FIG. 12.

Subsystem 150 uses three sets of data structures of the same form as 101, 102 and 103 to describe Network B:

1. Failure Structure 151 describes, in the example embodiment, a list of scenarios of failures of elements in Network B. These may include scenarios that Network B wishes to include in its simulations of the behavior of Network B, and in its planning of future modifications or optimizations of Network B.
2. Topology Structure 152 describes, in the example embodiment, the topology of Network B. Included in the structure is a representation of the links connecting Network B to Network A.
3. Demands Structure 153 contains, in the example embodiment, traffic demands (e.g., all traffic demands) that may be routed through Network B and therefore may affect the traffic usage and management of Network B. In particular, this includes demands with source in Network A and destination in Network B, demands with source and destination in Network B, and demands with source in Network B and destination in Network A.

In an example embodiment, these structures are generated by modules (not shown) which form part of the subsystem 150, namely a network topology module, a traffic demands module and a change module.

The Network Simulator 160 uses the information contained in 151, 152, 153, together with the Failover Matrix Structure 140 which has been received from subsystem 100 by a receiving module (not shown), to perform a simulation of the behavior of Network B. Specifically, the Network Simulator 160 produces a Demand Routing Structure 165 which describes the routing of each demand in 153 through Network B under each failure scenario described in 151. If any of these failure scenarios contain failures of one or more of the peering links from Network A to Network B, then the Network Simulator 160 may consult the Failover Matrix Structure 140 to determine the behavior of demands entering Network B through Network A on these peering links. Details of the Network Simulator 160 are provided in FIG. 13.

The Demand Routing Structure 165 may be displayed in a GUI 170 by the controller of Network B, to visualize the behavior of the network under failure scenarios. Details of some GUI elements are provided in FIG. 14. The Demand Routing Structure 165 may also be used as an input to Network Planning Tools 180, which can suggest modifications or optimizations of the network design or routing policies to mitigate the effects of the failures described, should they occur.

Figure 2:
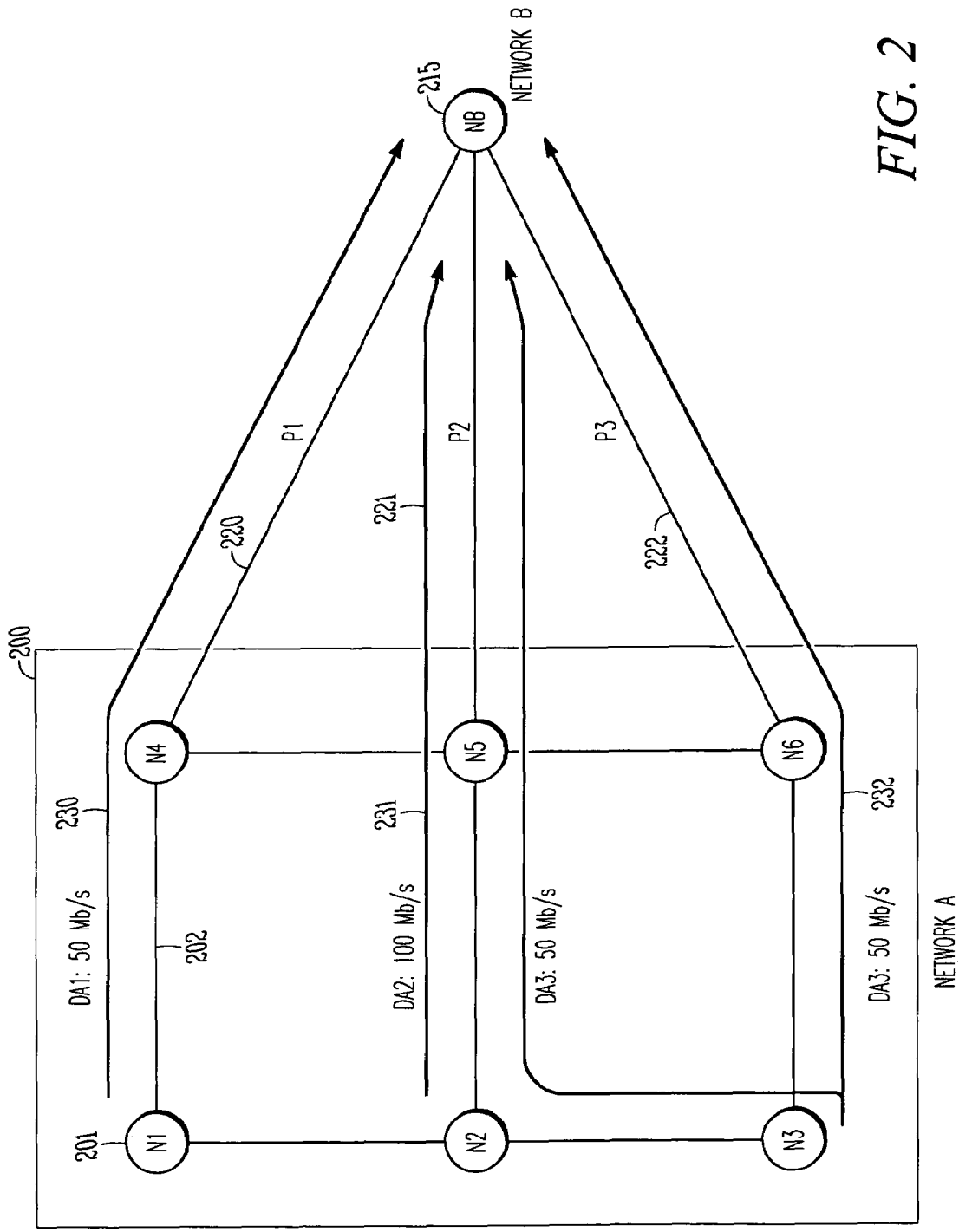
FIG. 2. represents an example model of Network A as used by the operator of Network A.

FIG. 2 represents an example model of Network A as used by the operator of Network A, which will be used to illustrate the data structures used by the system in FIG. 1. Network A, 200, consists in this example of a set of six nodes, or routers, N1 (201) through N6. The nodes are connected by bi-directional links. For example, 202 connects N1 to N4. Network B is represented in the diagram by a single node, 210, since the operator of Network A does not know the topology of Network B. The peering links between Network A and Network B (P1, P2 and P3, 220-222), connect nodes in Network A to Network B.

Three routed demands are represented in FIG. 2. DA1, DA2 and DA3 (230-232) are demands for traffic from N1, N2 and N3 respectively, to NB. Example routings of these demands across the links of Network A and across the peering links are shown. These are routings under normal operation: e.g., when no element of Network A has failed. Demands DA1, DA2 and DA3 carry 50, 100 and 100 Mb/s (Megabits per second) of traffic respectively. Note that DA3 has a split routing, which is allowed by, for example, the IGP shortest-path first routing protocol. Half of the traffic in the demand takes one route to the destination, and half takes another route.

Figure 3:
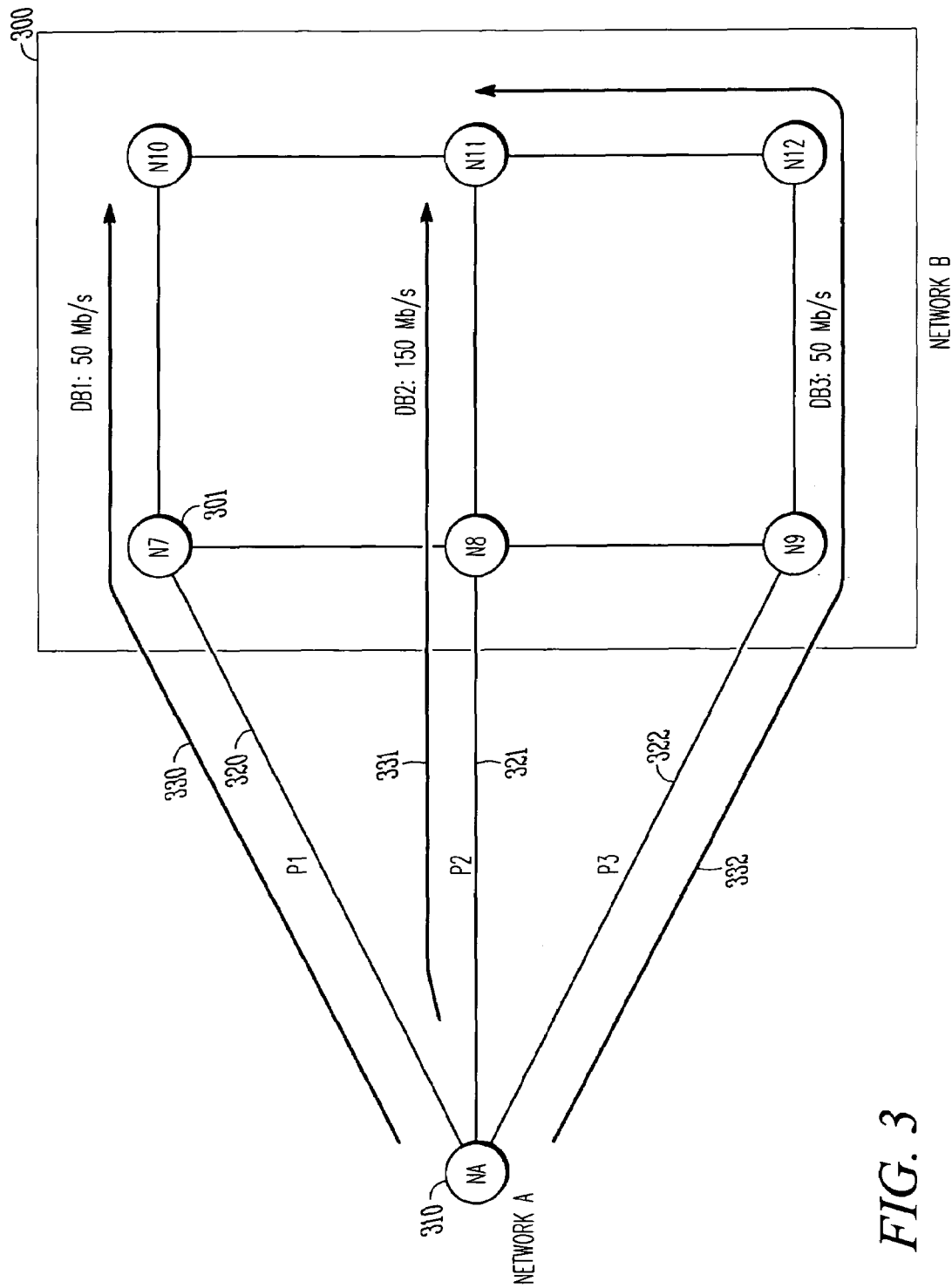
FIG. 3. represents an example model of Network B as used by the operator of Network B.

FIG. 3 represents an example model of Network B as used by the operator of Network B, which will be used to illustrate the data structures used by the system in FIG. 1. Network B, 300, consists in this example of a set of six nodes, or routers, N7 (301) through N12. The nodes are connected by bi-directional links. Network A is represented in the diagram by a single node, 310, since the operator of Network B does not know the topology of Network A. The peering links between Network A and Network B (P1, P2 and P3, 320-322) are the links 220-222 in FIG. 2.

Three routed demands are represented in FIG. 3. DB1, DB2, and DB3 (330-332), are demands for traffic from NA to N10, N11 and N11 respectively. Example routings of these demands across the peering links and the links of Network B are shown. These are routings under normal operation, similar to the routings of demands in FIG. 2.

FIG. 4 represents two of the data structures used by both subsystem 100 and subsystem 150 in FIG. 1 to store data used in the creation and use of the Failover Matrix Structure 140. In FIG. 4, the structures are filled with data representing the example Network A of FIG. 2, for illustration.

The Topology Structure 400, an example embodiment, contains a table, in which each row represents a link in the topology. The columns in the table may be as follows:
1. Link ID: a string identifying the link.
2. From: the node the link joins to which transmits data onto the link.
3. From Node/AS: either Node if the From node is a physical node, or AS (Autonomous System) if the From node is a summarized representation of another network.
4. To: the node the link joins to which receives data from the link.
5. To Node/AS: similar to From Node/AS, but describing the To node.

The Demands Structure 410 contains a table, in which each row represents a demand in the topology. The columns in the table may be as follows:
1. Demand ID: a string identifying the demand.
2. Source: either source node or source AS which initiates the transmission of traffic through the network.
3. Destination: either the destination node or destination AS which ultimately receives the transmission of traffic through the network.
4. Traffic (Mb/s): the quantity of traffic, in Mb/s (megabits per second) or some other measure of traffic quantity, to be transmitted.

FIG. 5 represents a Failure Structure 500, according to example embodiment, which is used in both subsystems 100 and 150 of FIG. 1 to describe the failure scenarios of interest in the construction and use of the Failover Matrix Structure 140.

The Failure Structure 500 contains, as an example illustration, a description of three failure scenarios of the example Network A of FIG. 2. The Failure structure 500 may be a table, in which each row of the table represents a particular failure scenario. Each column of the table represents a link in the network. Each entry in the table is either blank, or is marked with an X. An X in a particular row and column specifies that the failure scenario represented by that row includes (at least) the failure of the link represented by that column. The three failure scenarios in 500 represent failures of the three peering links, 220-222, in FIG. 2.

Note that one failure scenario may contain multiple link failures. For example, the Failure Structure 510 contains a description of a failure in Network B of FIG. 3. The failure that is represented is the failure of a node in the network, which is described as a failure of all links connected to that node. Therefore, in the table, links P2, N8-N7 and N8-N10 (amongst others) are marked with an X.

Figure 6:
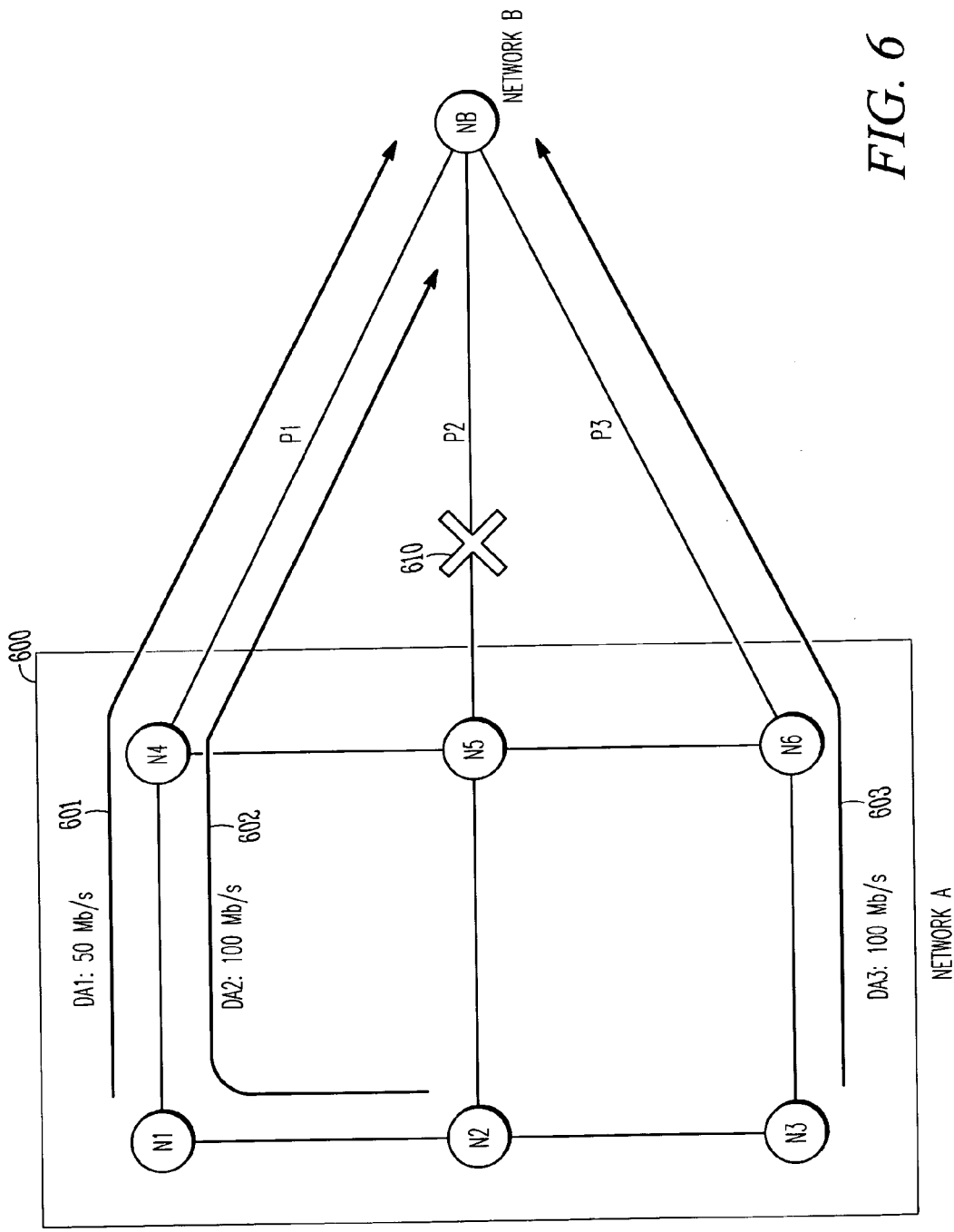
FIG. 6. shows an example of Network A of FIG. 2 in a particular failure state.

FIG. 6 represents the example Network A of FIG. 2, in a particular failure state. This figure will serve as an example in the construction of the Peer Link Usage structure and Failover Matrix structure of FIG. 7.

Network A, 600, is the same network as in FIG. 2. In this figure one of the peering links, P2 has failed, represented by the cross 610. This is the failure scenario represented in the second row of the table in the structure 500 in FIG. 5. The three demands, DA1, DA2 and DA3 (601-603) have been rerouted to avoid the failed peering link. In this failure scenario they use only peering links P1 and P3 to reach their common destination NB, Network B.

FIG. 7 represents the Peer Link Usage Structure, 700, and the Failover Matrix Structure, 710, calculated by subsystem 100 of FIG. 1. In this figure the structures are filled using the example Network A of FIG. 2, and the example failure scenarios in Failure Structure 500 in FIG. 5.

The Peer Link Usage Structure 700 consists of a table in which each row represents a failure scenario copied from the Failure Structure 500. In addition, the first row represents the "No Failure" scenario in which no element in the network fails. The columns represent peering links. In this example there are three peering links, P1, P2 and P3.

An entry for a particular row and column is the usage, in Mb/s, of that peering link under that failure scenario. If that peering link fails under that failure scenario, no number is entered. For example, consider the failure scenario P2 represented in the third row of table 700 and in FIG. 6. Under this failure scenario Network A reroutes Demand DA2 through peering link P1, so that the total usage of P1 is 50 Mb/s from DA1, and 100 Mb/s from DA2. Therefore the usage total, 150 Mb/s, is entered in the third row, second column of table 700.

Once the Peer Link Usage Structure 700 has been calculated, the Failover Matrix Constructor 130 of the subsystem 100 of FIG. 1 calculates a Failover Matrix Structure 140. The Failover Matrix Structure 140 contains the data corresponding to the Peer Link Usage Structure 700.

The Failover Matrix Structure 140 may be implemented as a table in which each row represents a failure scenario, and each row represents a peering circuit. An entry, in an example embodiment, for a particular row and column may be either:

1. blank, if the corresponding failure scenario fails the corresponding peering link, or
2. equal to the percentage of traffic from all failed links in that row that is transferred to the peering link. For example, from the structure 700, it is seen that under the failure scenario P2, 150 Mb/s of traffic that normally transits through P2 is rerouted. Under failure scenario P2, the usage of P1 increases by 100 Mb/s, which is 67% of 150 Mb/s. Therefore, the entry in the row of 710 corresponding to the failure scenario P2, and in the column corresponding to the peering circuit P1, is 67%.

Figure 8:
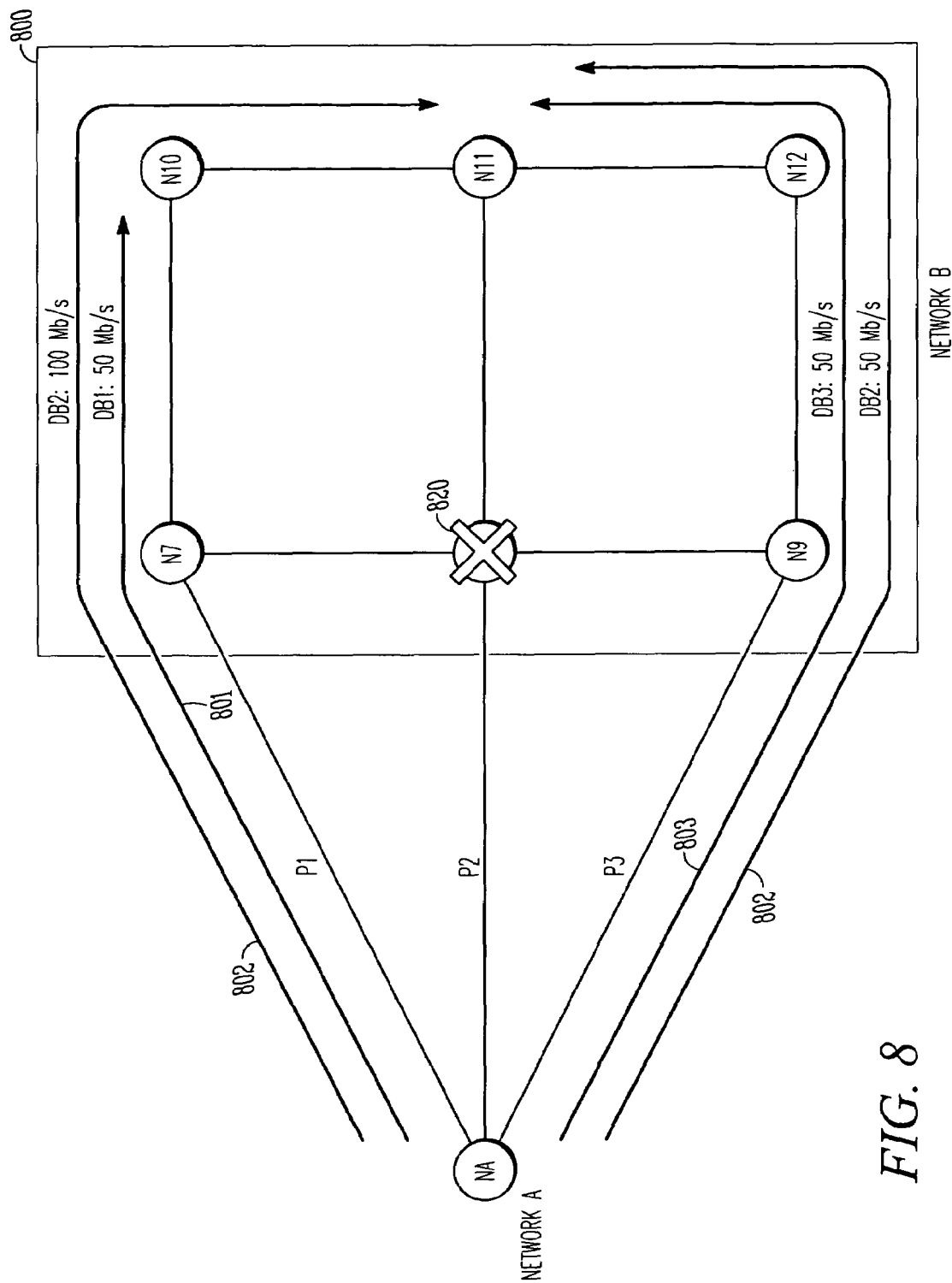
FIG. 8. shows an example Network B of FIG. 3 in a particular failure state.

FIG. 8 represents the example Network B of FIG. 3, in a particular failure state. This figure will serve as an example in the construction of the Demand Routing Structure of FIG. 9.

Network B, 800, is the same network as in FIG. 2. In this figure one of the nodes in the network, N8 (820), has failed, represented by a cross through the node. This is the failure scenario represented in the table in structure 510 of FIG. 5. The three demands, DB1, DB2 and DB3 (801-803), sourced from Network A, have been rerouted to avoid the failed node.

Figure 9:
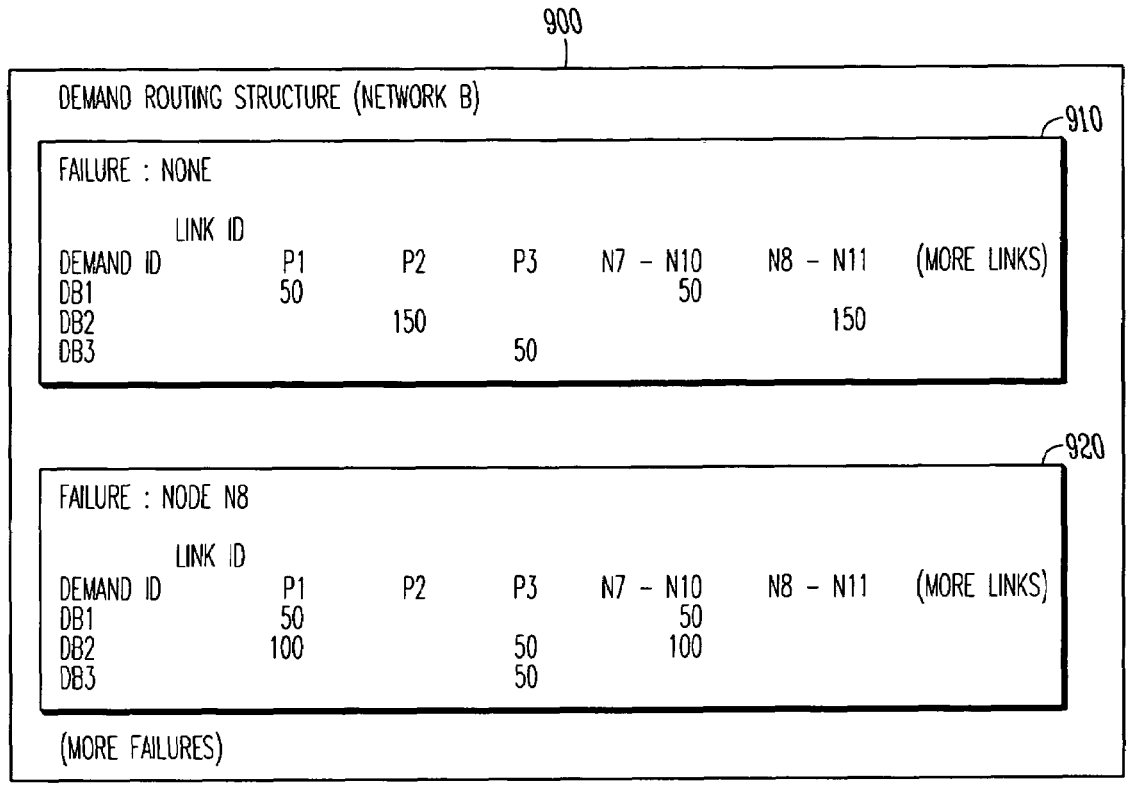
FIG. 9. is an example Demand Routing Structure.

FIG. 9 represents the Demand Routing Structure 900 that the Network Simulator 160 in FIG. 1 calculates using the Failover Matrix Structure 140 and the Failure, Topology and Demands Structures 151-153 of Network B.

The Demand Routing Structure 900 may contain one table for every failure scenario in the Failure Scenario Structure 151, and one table for the normal operation of the network, in which no element has failed. In the figure, two of these tables are represented: 910, the normal operation table, and 920, the table corresponding to the failure of Node N8, which is the single failure scenario represented in Failure Structure 510 of FIG. 5.

Each table in 900 has one row for each demand in the network, and one column for each link in the network. An entry in a table corresponding to a particular demand and link is the amount of traffic from that demand transiting through that link.

Figure 10:
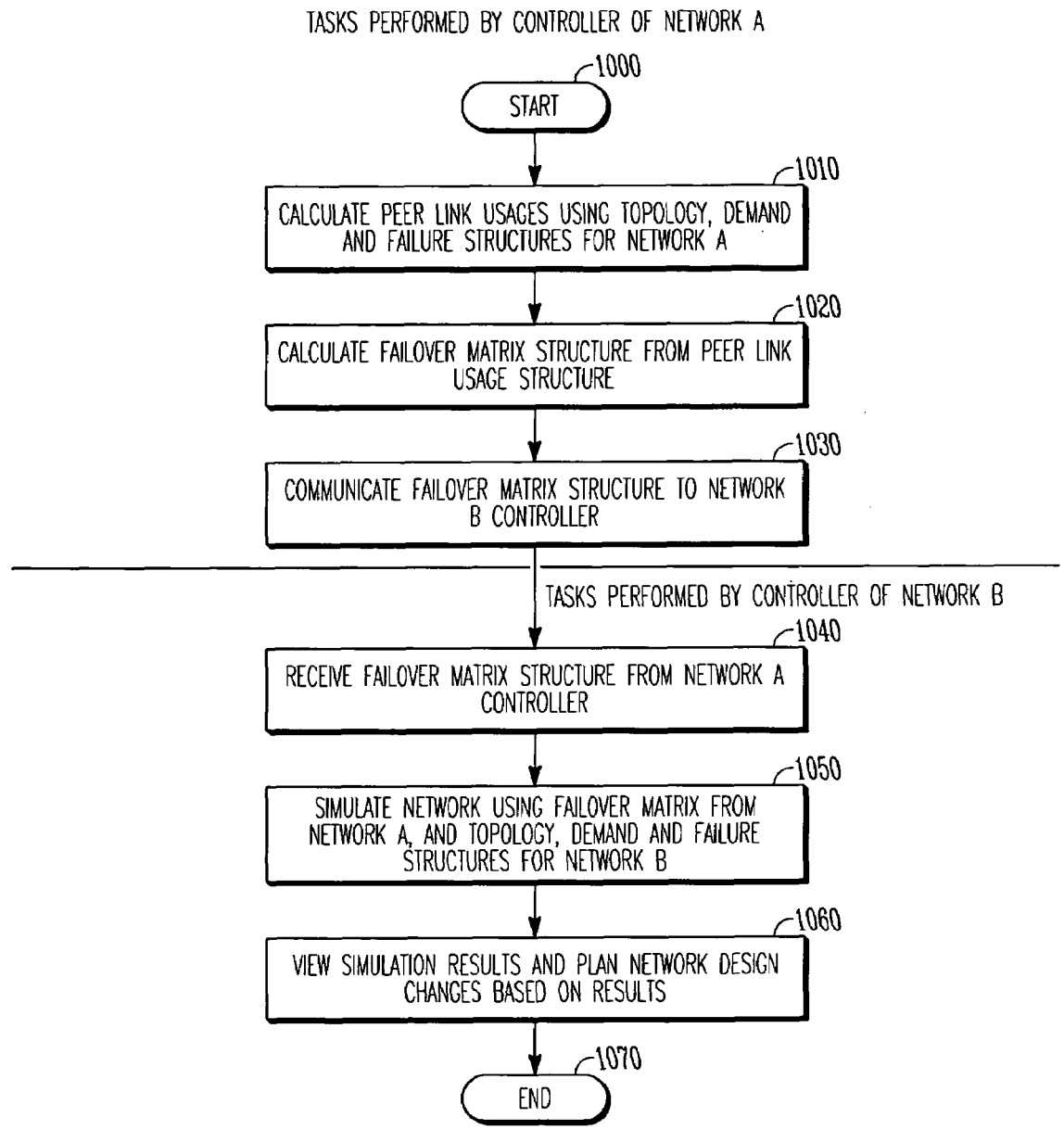
FIG. 10. is a flowchart describing an example method performed by the system of FIG. 1.

FIG. 10 is a flowchart describing the procedure, according to an example embodiment, performed by the system in FIG. 1. The flow starts at 1000. In 1010, the Topology, Demand and Failure Structures of Network A are used by the Peer Link Usage Calculator 110 to construct the Peer Link Usage Structure 120. This process is described further in FIG. 11.

In 1020, the Peer Link Usage Structure 120 is used by the Failover Matrix Constructor 130 to calculate the Failover Matrix Structure 140. This process is described further in FIG. 12.

In 1030, Network A transmits the Failover Matrix Structure 140 to Network B.

In 1040, Network B receives the Failover Matrix Structure 140 from Network A.

In 1050, the Network Simulator 160 uses the Topology, Demand and Failure Structures of Network B, together with the Failover Matrix Structure, to simulate the routings of demands in Network B, so constructing the Demand Routing Structure 165. This process is described further in FIG. 13.

Figure 14:
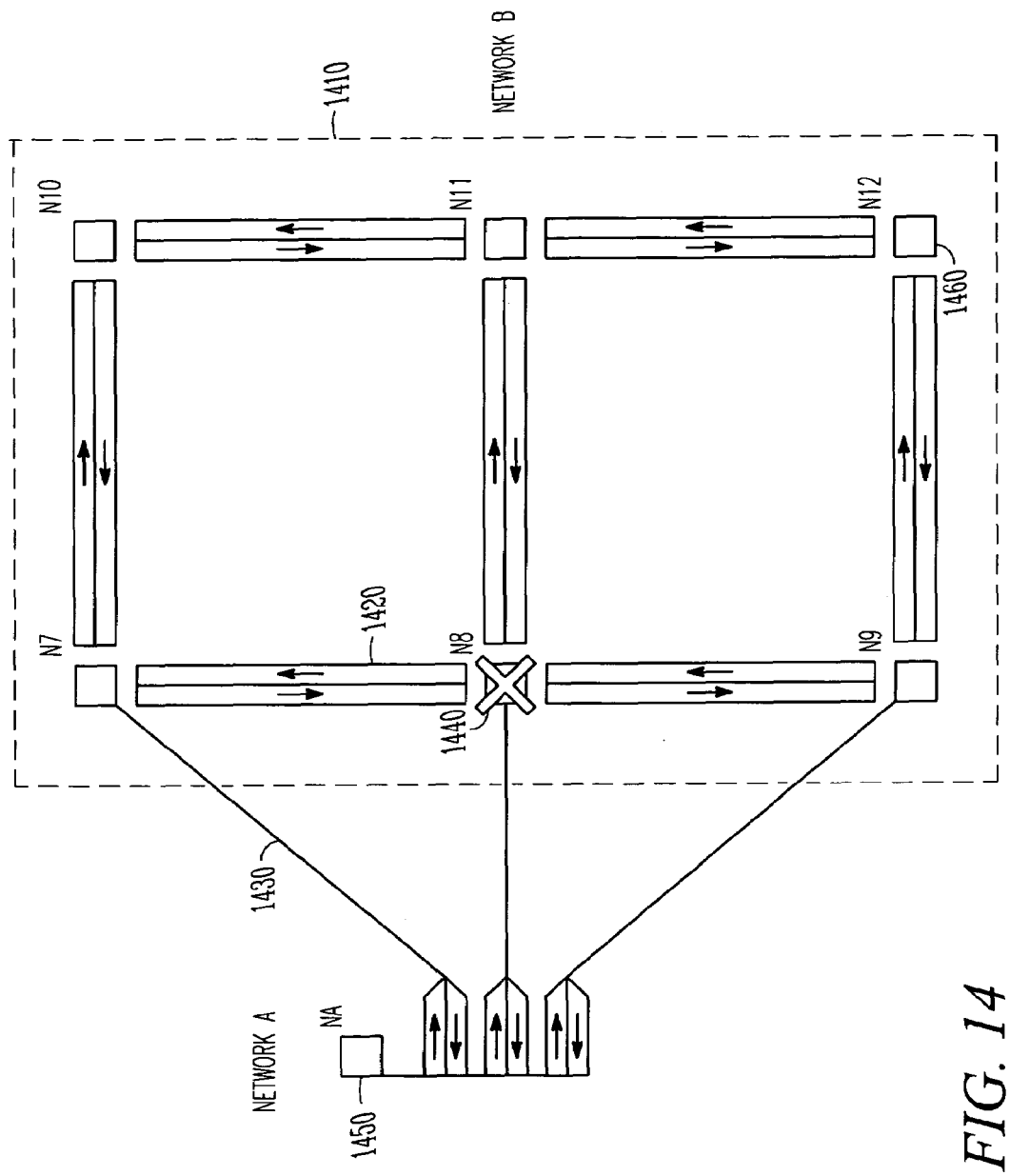
FIG. 14. shows an example graphical user interface.

In 1060 the Demand Routing Structure 165 is used to view the network simulation through a GUI, and to suggest and implement optimizations to the network layout, routings and future planning in light of the behavior of the network described by these routings. FIG. 14 illustrates some GUI elements that may be used to display the network simulation, with particular reference to the simulation of demands from a peered network.

The procedure ends at 1070.

Figure 11:
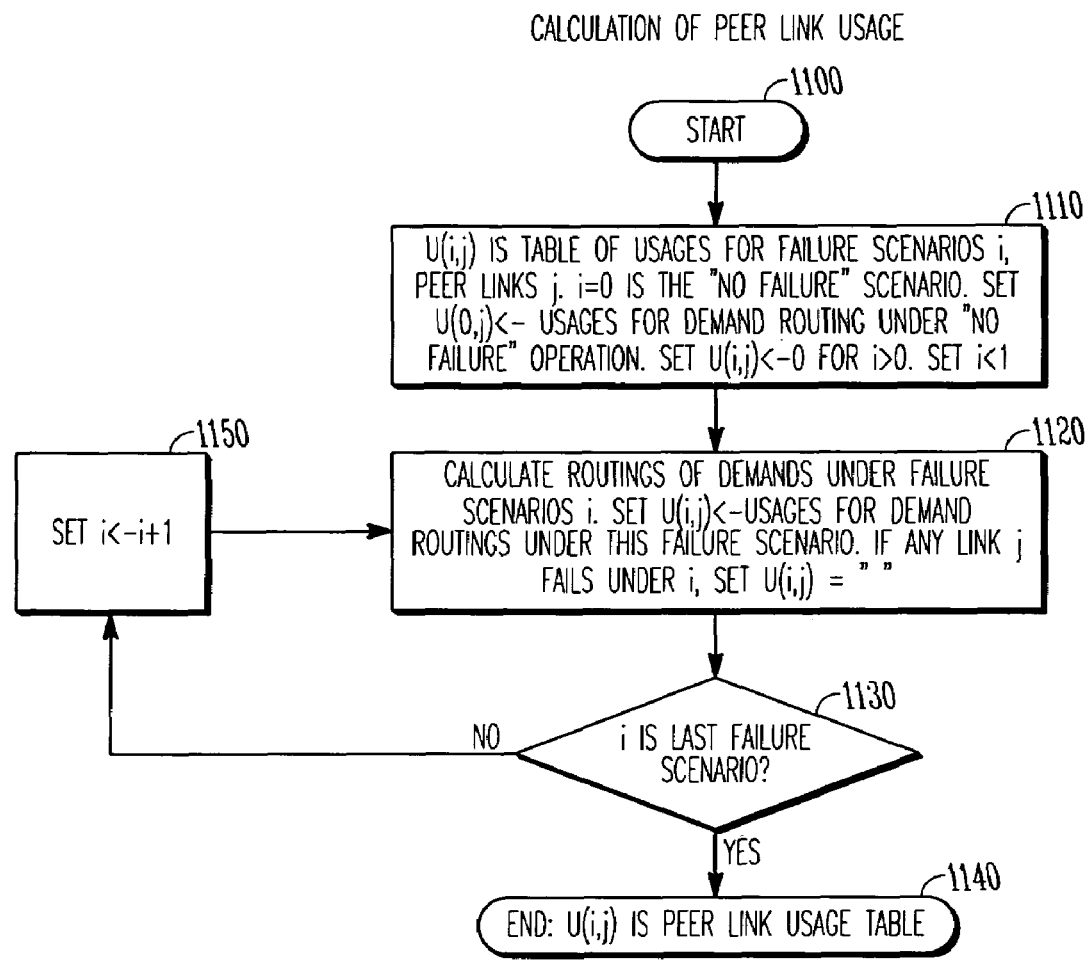
FIG. 11. is a flowchart describing an example method of calculating peer linkage.

FIG. 11 is a flowchart describing a method, according to an example embodiment, to calculate a Peer Link Usage Structure 120 by the Peer Link Usage Calculator 110 in FIG. 1. The process starts at 1100.

In 1110, the Peer Link Usage Structure 120 is defined to be the matrix $U(i,j)$, where i indexes the failure scenarios and j indexes the peering links. i=0 is reserved for the normal, "no failure" scenario. Initially, $U(0,j)$, for each j, is set to the link usages resulting from routing the demands under the "no failure" scenario. The demands are routed using whichever routing protocols are used by Network A, for example, the IP routing protocols. Each $U(i,j)$, for i>0, is set to 0. The index i is set to 1.

In 1120, the peering links $U(i,j)$ for the given failure scenario i are set to the usages resulting in demand routings under the failure scenario i, again simulating the behavior of the routing protocol used by Network A, and in particular the behavior of this protocol on encountering the failures as described by the failure scenario. If any peering link j fails under failure scenario i, set $U(i,j)$ to be "-", indicating that there is no usage in this link.

In 1130, a check is made to see if i is the last failure scenario in the Failure Structure for Network A. If so, the process ends at 1140, with $U(i,j)$ the required peer link usage table. If not, i is incremented in 1150 and control returns to 1120.

Figure 12:
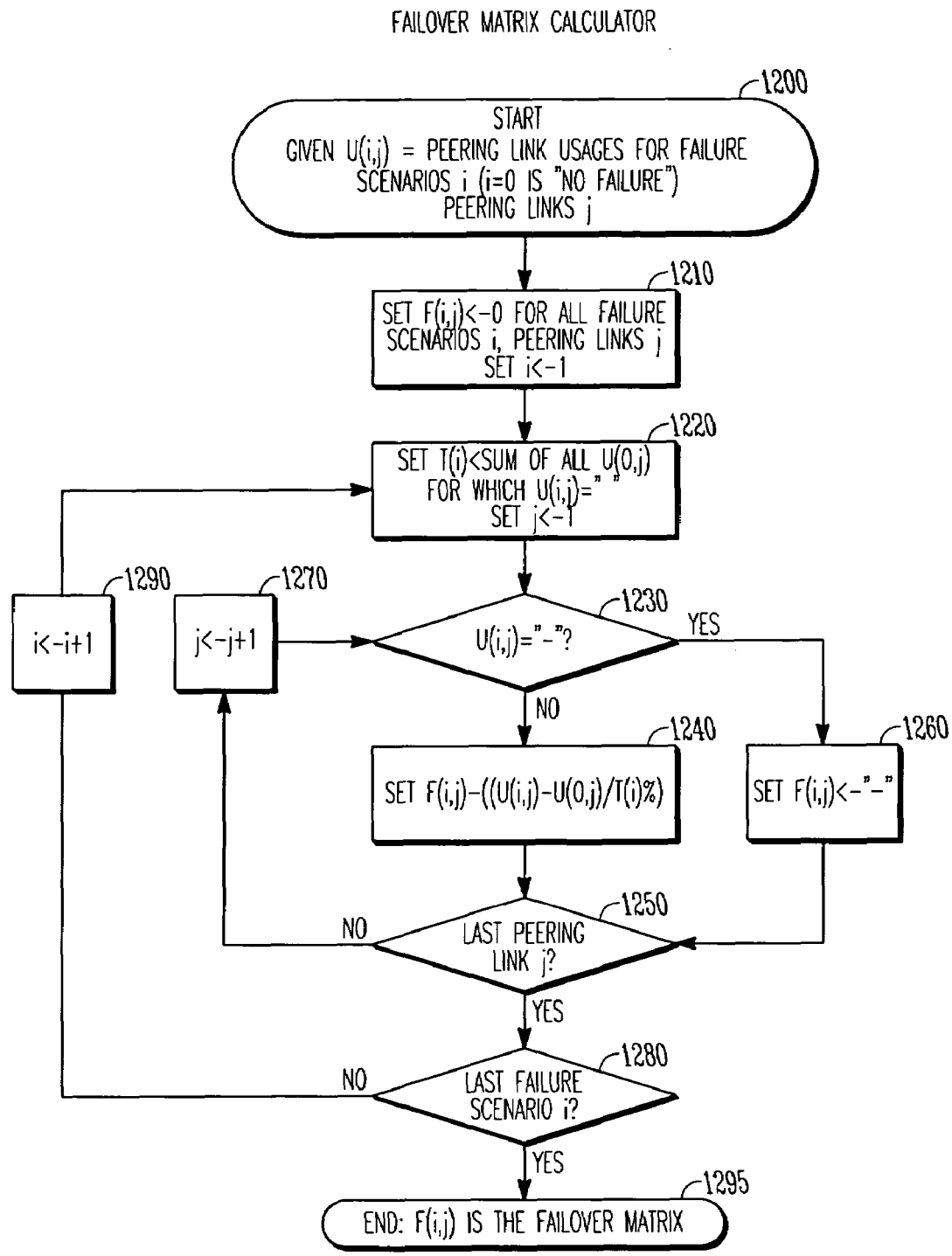
FIG. 12. is a flowchart describing an example method of calculating a failover matrix.

FIG. 12 is a flowchart describing a method, according to an example embodiment, for the calculation of the Failover Matrix Structure 140 by the Failover Matrix Constructor 130 in FIG. 1.

The process starts at 1200. The peering link usage structure $U(i,j)$ is given, where i=0 represents the "no failure" case.

In 1210, $F(i,j)$ is set to 0 for all failure scenarios i and peering links j, and i is initialized to 1. $F(i,j)$ will be filled in with the Failover Matrix Structure 140.

In 1220, $T(i)$ is set to be the total of all usages $U(0,j)$ for which $U(i,j)$ is equal to "-". That is, $T(i)$ is the total amount of traffic that must shift from failed peering links to other links under scenario i. Peering link counter j is initialized to 1.

In 1230, a branch is made depending on whether $U(i,j)=$"-". If yes, in 1260 $F(i,j)$ is also set to "-". If no, in 1240 $F(i,j)$ is set to the increase in traffic in link i in this failure scenario compared to the no failure scenario, as a percentage of the total displaced traffic $T(i)$. That is, $F(i,j)$ is set to $(U(i,j)-U(0,j))/T(i)$, expressed as a percentage.

In 1250, a branch is made depending on whether the last peering link j has been reached. If so, control moves to 1270. If not, j is incremented in 1280 and control moves back to 1230.

In 1270, a branch is made depending on whether the last failure scenario i has been reached. If so, control moves to 1295. If not, i is incremented in 1290 and control moves back to 1220.

Figure 13:
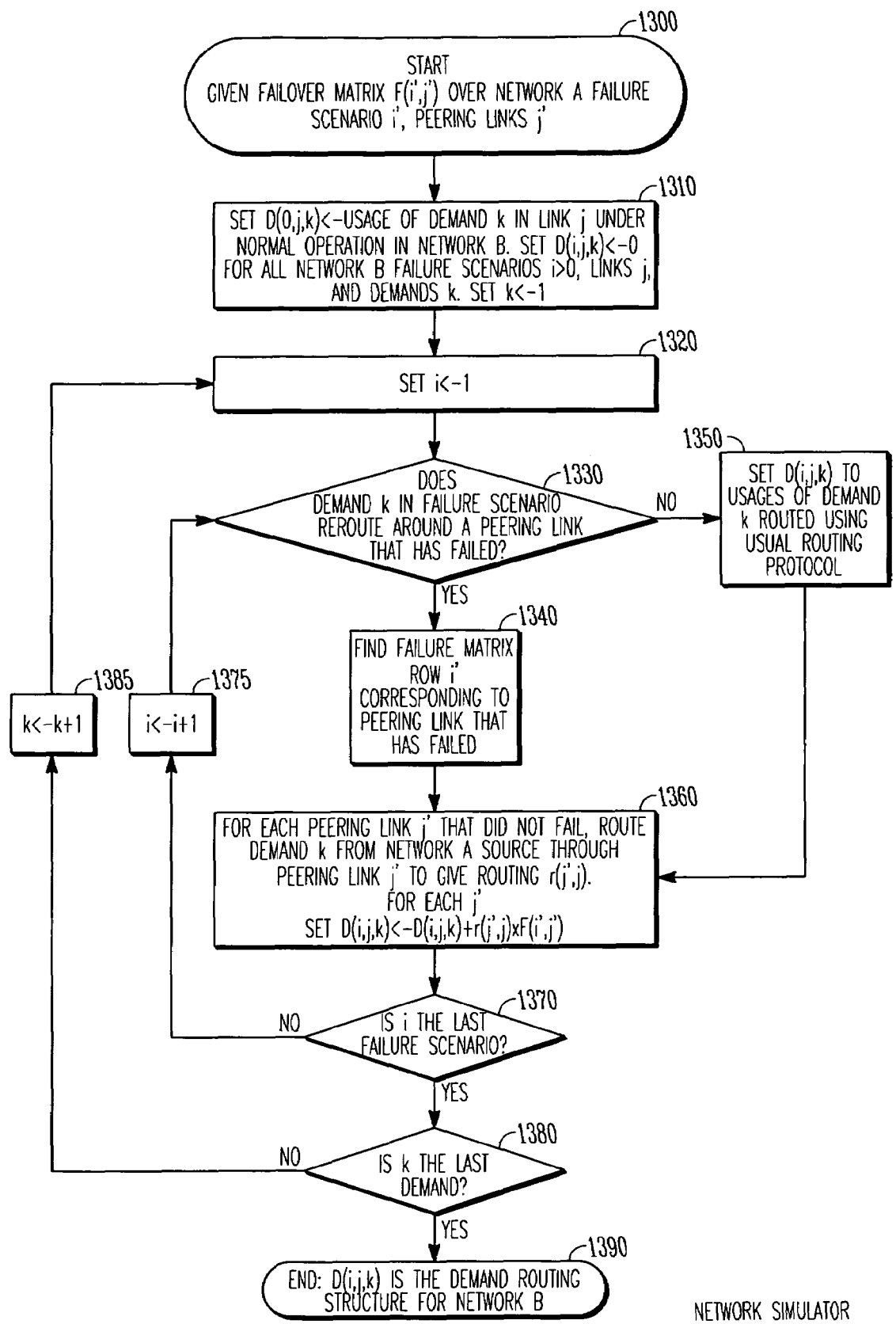
FIG. 13. is a flowchart describing an example method of simulating a network.

FIG. 13 is a flowchart describing a method, according to an example embodiment, for the simulation of Network B in 160 of FIG. 1.

The process starts at 1300. $F(i',j')$, the failover matrix provided to Network B by Network A, is given. Here i' indexes the failure scenarios of Network A, and j' indexes the failure scenarios of Network A.

The Demand Routing Structure 165 is represented by the three-way array $D(i,j,k)$. Here i indexes failure scenarios in Network B, with i=0 being the "no failure" scenario; j indexes the links of Network B, and k indexes the demands in Network B.

In 1310, D(0,j,k), for each link j and demand k, is set to the usage of demand k in link j under normal operation in Network B. Each D(i,j,k) for i>0 is set to 0. Demand index k is initialized to 1.

In 1320, the failure scenario index i is initialized to 1.

In 1330, a branch is made depending on whether demand k, in failure scenario i, will be rerouted around a peering link that has failed. If not, in 1350 the D(i,j,k) for this i are set to the usages of demand k routed in this failure scenario simulating the usual protocol used in routing demands in Network B. If not, in 1340 the failover matrix F(i',j') is consulted for the row i' representing the failure scenario i' in Network A with matching peering link failures to the failure scenario i in Network B under consideration.

In 1360, a routing r(j',j) is calculated for demand k, over all links j in Network B, for each peering link j' which does not fail under scenario i, assuming that the demand entered network B through that link j', and using the usual protocol for routing in Network B. For each j', D(i,j,k) is incremented by r(j',j) × F(i',j'). That is, D(i,j,k) is routed simultaneously through all the non-failing peering links in the proportion that the Failover Matrix Structure 140 specifies is the proportion that traffic fails over from the failing peering link to the other peering links.

In 1370, a branch is made depending on whether the last failure scenario i has been reached. If so, control moves to 1380. If not, i is incremented in 1375 and control moves back to 1330.

In 1380, a branch is made depending on whether the last demand k has been reached. If so, control moves to 1390. If not, k is incremented in 1385 and control moves back to 1320.

The flow ends at 1390, where the demand routing structure D(i,j,k) is complete.

FIG. 14 is a schematic representation of a Graphical User Interface (GUI), according to an example embodiment, that may be used to view the results of the network simulation performed by 160 of FIG. 1. As an example, Network B of FIG. 3 is represented. The topology of Network B is completely known to the operator of this network, and so it can be represented fully, as in box 1410, with all nodes, or routers, such as 1460 displayed, and all circuits such as 1420 displayed. These bi-directional circuits are shown with links in both directions side by side, with arrows showing the direction of the constituent links. The space within each link may be filled with different colors to represent, for example, the overall usage of that link under a particular failure scenario, or whether or not a demand passes through that link under a particular failure scenario. The GUI may be used to view different failure scenarios by showing the failed elements crossed out. The failure scenario represented in FIG. 6, for example, is represented here with a cross 1440 through node N8, which is failed in this failure scenario.

The topology of Network A is unknown to Network B. Only the peering circuits connecting Network A to Network B are known. So Network A can be represented as in 1400, "collapsed" into a single node. The peering circuits are represented as in 1450 as circuits connected to the node 1400.

Typically, a network may be connected through peering connections to many peer networks. In this case, representing all the peering circuits as two bi-directional links, as for example is done in the circuit's interior to Network B, such as 1420, can cause a large amount of clutter on the screen, or printed out representation of the network. So peering circuits may be represented as a short circuit as in 1450, and the node in Network B to which it is connected is shown by drawing a single line, as in 1430, from the tip of the circuit 1450 to the node. This line may be removed completely remove clutter further.

Figure 15:
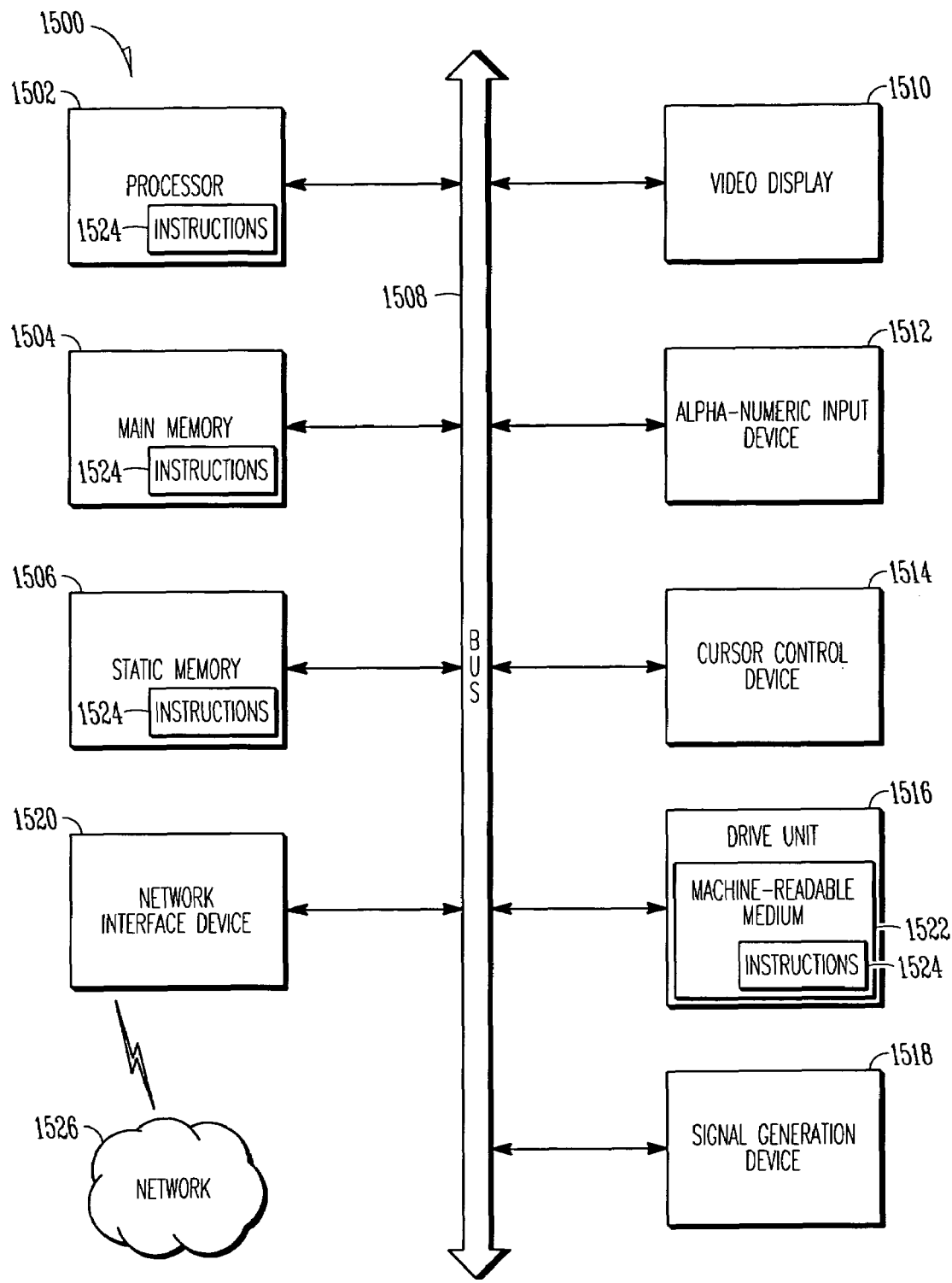
FIG. 15 shows a diagrammatic representation of machine in the example form of a computer system.

FIG. 15 shows a diagrammatic representation of machine in the example form of a computer system 1500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a video display unit 1510 (e.g., a liquid crystal display (LCD) or a cathode ray tube (CRT)). The computer system 1500 also includes an alphanumeric input device 1512 (e.g., a keyboard), a user interface (UI) navigation device 1514 (e.g., a mouse), a disk drive unit 1516, a signal generation device 1518 (e.g., a speaker) and a network interface device 1520.

The disk drive unit 1516 includes a machine-readable medium 1522 on which is stored one or more sets of instructions and data structures (e.g., software 1524) embodying or utilized by any one or more of the methodologies or functions described herein. The software 1524 may also reside, completely or at least partially, within the main memory 1504 and/or within the processor 1502 during execution thereof by the computer system 1500, the main memory 1504 and the processor 1502 also constituting machine-readable media.

The software 1524 may further be transmitted or received over a network 1526 via the network interface device 1520 utilizing any one of a number of well-known transfer protocols (e.g., HTTP).

While the machine-readable medium 1522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

What is claimed is:

1. A method comprising:

generating network topology structure data describing at least part of a topology of a first network, the first network having a plurality of first peer nodes providing peering links to a plurality of second peer nodes in a second network, the plurality of first peer nodes of the first network being connected to corresponding ones of the plurality of second peer nodes of the second network;

generating demand structure data describing at least some traffic demands relating to a source in the first network and a destination in the second network, wherein there are a plurality of network links between the first network and the second network, the plurality of network links being peering links;

generating traffic routing change data describing at least one change scenario which would require a change of traffic routing;

using the network topology structure data, the demand structure data and the traffic routing change data to calculate a routing of traffic through each of the plurality of network links between the first network and the second network for the at least one change scenario, the calculation of routing of traffic for the at least one change scenario including calculating how much traffic will be routed through each of the plurality of network links in the event of one or more of the network links being changed; and transmitting change data to the second network, the change data describing network traffic movement through the plurality of network links in the at least one change scenario, the change data being determined from the calculation of routing of traffic through each of the plurality of network links between the first network and the second network for the at least one change scenario.

2. The method of claim 1 wherein the change scenario is at least one of a maintenance scenario and a failure scenario in which at least one of the network links is to be maintained or fails.

3. The method of claim 1 wherein the routing of traffic through each of the plurality of network links between the first network and the second network is calculated for a plurality of change scenarios.

4. The method of claim 1 wherein the change data describes enough information to enable an operator of the second network to plan for the possible change scenario while not revealing other information about the first network to the second network operator.

5. The method of claim 1 wherein the demand structure data, for each of the traffic demands, describes the source of the demand, the destination of the demand and the size of the demand.

6. The method of claim 1 wherein the network topology structure data includes data describing the plurality of network links between the first network and the second network.

7. The method of claim 1 wherein the change data includes, for each of the change scenarios, the percentage increase of traffic that will be routed through each of the plurality of network links in the event of one or more of the network links being changed.

8. The method of claim 7 wherein the percentage increase is a percentage of the traffic that will be re-routed in the event of a change scenario.

9. A system comprising:
a memory device for storing network information;
a network topology module to generate network topology structure data describing at least part of a topology of a first network and to store the network topology structure data in the memory device, the first network having a plurality of first peer nodes providing peering links to a plurality of second peer nodes in a second network, the plurality of first peer nodes of the first network being connected to corresponding ones of the plurality of second peer nodes of the second network;

a traffic demands module to generate demand structure data describing at least some traffic demands relating to a source in the first network and a destination in the second network, wherein there are a plurality of network links between the first network and the second network, the plurality of network links being peering links, and to store the demand structure data in the memory device;

a traffic routing change module to generate traffic routing change data describing at least one change scenario and to store the traffic routing change data in the memory device;

a calculator to use the network topology structure data, the demand structure data and the traffic routing change data to calculate a routing of traffic through each of the plurality of network links between the first network and the second network for the at least one change scenario, the calculation of routing of traffic for the at least one change scenario including calculating how much traffic will be routed through each of the plurality of network links in the event of one or more of the network links being changed; and a transmitting module to transmit change data to the second network, the change data describing network traffic movement through the plurality of network links in the at least one change scenario, the change data being determined from the calculation of routing of traffic through each of the plurality of network links between the first network and the second network for the at least one change scenario.

10. The system of claim 9 wherein the network change scenario is at least one of a maintenance scenario and a failure scenario in which at least one of the network links is to be maintained or fails.

11. The system of claim 9 wherein the second network change scenario is at least one of a maintenance scenario and a failure scenario in which at least one node of the second network is to be maintained or fails.

12. The system of claim 9 wherein the calculator calculates the routing of traffic through each of the plurality of network links between the first network and the second network for a plurality of change scenarios.

13. The system of claim 9 wherein the transmitting module transmits change data that describes enough information to enable an operator of the second network to plan for the possible change scenario while not revealing other information about the first network to the second network operator.

14. The system of claim 9 wherein the traffic demands module generates demand structure data, for each of the traffic demands, which describes the source of the demand, the destination of the demand and the size of the demand.

15. The system of claim 9 wherein the network topology module generates network topology structure data that includes data describing the plurality of network links between the first network and the second network.

16. The system of claim 9 wherein the calculator determines the change data to include, for each of the change scenarios, the percentage increase of traffic that will be routed through each of the plurality of network links in the event of one or more of the network links being changed.

17. The system of claim 16 wherein the percentage increase is a percentage of the traffic that will be re-routed in the event of a change scenario.

* * * * *

UNITED STATES PATENT AND TRADEMARK OFFICE
CERTIFICATE OF CORRECTION

| | | |
|---|---|---|
| PATENT NO. | : 7,734,813 B2 | Page 1 of 1 |
| APPLICATION NO. | : 11/341057 | |
| DATED | : June 8, 2010 | |
| INVENTOR(S) | : Alan T. Gous et al. | |

It is certified that error appears in the above-identified patent and that said Letters Patent is hereby corrected as shown below:

On Sheet 10 of 14, in Figure 11, Reference Numeral 1120, line 4, delete "= """" and insert -- = "-" --, therefor.

In column 1, line 49, delete "FIG. 2." and insert -- FIG. 2 --, therefor.

In column 1, line 51, delete "FIG. 3." and insert -- FIG. 3 --, therefor.

In column 1, line 53, delete "FIG. 4." and insert -- FIG. 4 --, therefor.

In column 1, line 56, delete "FIG. 5." and insert -- FIG. 5 --, therefor.

In column 1, line 59, delete "FIG. 6." and insert -- FIG. 6 --, therefor.

In column 1, line 61, delete "FIG. 7." and insert -- FIG. 7 --, therefor.

In column 1, line 62, delete "FIG. 8." and insert -- FIG. 8 --, therefor.

In column 1, line 65, delete "FIG. 9." and insert -- FIG. 9 --, therefor.

In column 1, line 66, delete "FIG. 10." and insert -- FIG. 10 --, therefor.

In column 2, line 1, delete "FIG. 11." and insert -- FIG. 11 --, therefor.

In column 2, line 3, delete "FIG. 12." and insert -- FIG. 12 --, therefor.

In column 2, line 5, delete "FIG. 13." and insert -- FIG. 13 --, therefor.

In column 2, line 7, delete "FIG. 14." and insert -- FIG. 14 --, therefor.

In column 8, line 45, delete ""="-"."" and insert -- ="-". --, therefor.

Signed and Sealed this

Twenty-seventh Day of July, 2010

David J. Kappos
*Director of the United States Patent and Trademark Office*